(12) United States Patent
de Rooij et al.

(10) Patent No.: US 7,142,440 B2
(45) Date of Patent: *Nov. 28, 2006

(54) RIPPLE-CURRENT REDUCTION FOR TRANSFORMERS

(75) Inventors: Michael Andrew de Rooij, Schenectady, NY (US); Robert Louis Steigerwald, Burnt Hills, NY (US); Michael Joseph Schutten, Rotterdam, NY (US)

(73) Assignee: General Electric Company, Niskayuna, NY (US)

( * ) Notice: Subject to any disclaimer, the term of this patent is extended or adjusted under 35 U.S.C. 154(b) by 291 days.

This patent is subject to a terminal disclaimer.

(21) Appl. No.: 10/845,694

(22) Filed: May 14, 2004

(65) Prior Publication Data

US 2005/0073863 A1    Apr. 7, 2005

Related U.S. Application Data

(63) Continuation-in-part of application No. 10/676,898, filed on Oct. 1, 2003, now Pat. No. 7,016,205.

(51) Int. Cl.
*H02J 3/01* (2006.01)
(52) U.S. Cl. .............................. 363/39; 363/40; 363/46
(58) Field of Classification Search .................. 363/39, 363/40, 44, 45, 46

See application file for complete search history.

(56) References Cited

U.S. PATENT DOCUMENTS

| | | | | | |
|---|---|---|---|---|---|
| 3,761,797 | A | * | 9/1973 | Spooner | 363/46 |
| 4,594,648 | A | * | 6/1986 | Gallios | 363/46 |
| 4,710,861 | A | * | 12/1987 | Kanner | 363/46 |
| 5,038,263 | A | | 8/1991 | Marrero et al. | 363/20 |
| 5,663,876 | A | | 9/1997 | Newton et al. | 363/126 |
| 5,668,708 | A | * | 9/1997 | Scapellati | 363/46 |
| 6,693,805 | B1 | | 2/2004 | Steigerwald et al. | 363/39 |

FOREIGN PATENT DOCUMENTS

DE        4437560        5/1996

OTHER PUBLICATIONS

Michael J. Schutten, et al, "Ripple Current Cancellation Circuit", 2003 IEEE, pp. 464-470.
G. Laimer, et al., "Zero-Ripple EMI Input Filter Concepts for Application in a 1-U 500kHz Si/SiC Three-Phase PWM Rectifier", IEICE/IEEE Intele C '03, Cot. 19-23, 2003, pp. 750-756.

* cited by examiner

*Primary Examiner*—Jeffrey Sterrett
(74) *Attorney, Agent, or Firm*—Ann M. Agosti; Patrick K. Patnode

(57) ABSTRACT

A ripple current reduction circuit is provided that reduces the ripple current of a transformer by providing a substantially opposite or inverse ripple of an auxiliary current that can be combined with the ripple current of the transformer for cancellation or reduction of the ripple current.

39 Claims, 5 Drawing Sheets

*Fig. 1*
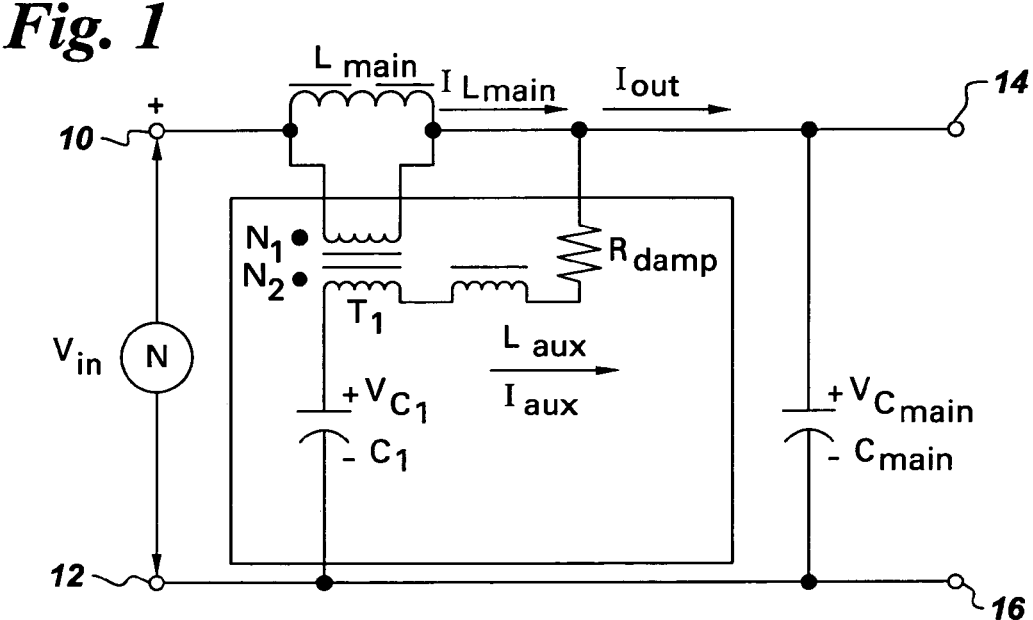
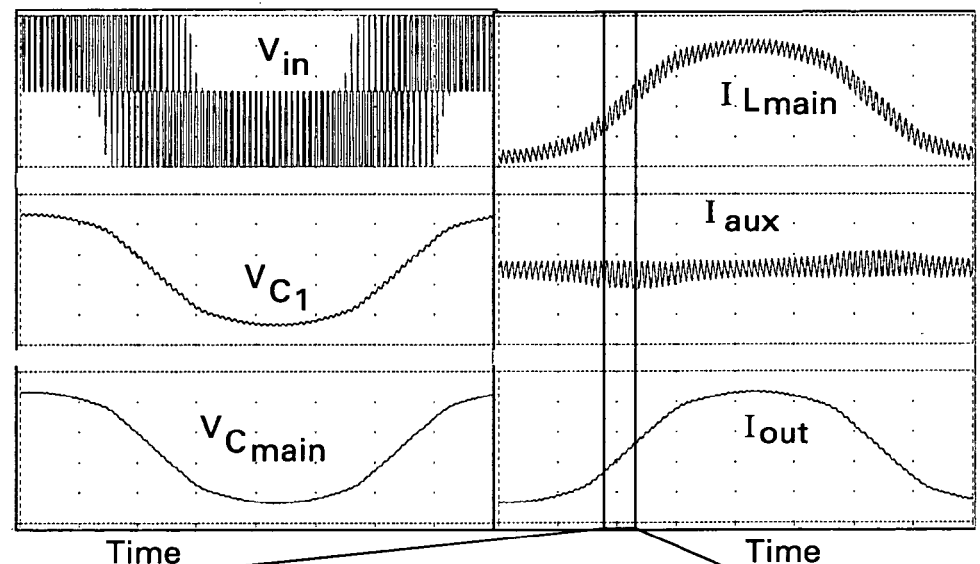
*Fig. 2*

RIPPLE-CURRENT REDUCTION FOR TRANSFORMERS

CROSS-REFERENCE TO RELATED APPLICATIONS

This application is a continuation-in-part of U.S. patent application Ser. No. 10/676,898, filed on Oct. 1, 2003 now U.S. Pat. No. 7,016,205, for "Ripple-Current Reduction Schemes for AC Converters", the contents of which are incorporated by reference herein.

BACKGROUND OF THE INVENTION

1. Field of the Invention

The present disclosure is in the field of ripple-current reduction techniques and, more particularly, relates to the application of such techniques to power electronic circuits, particularly those of transformers.

2. Description of the Related Art

Inductors are used in many ways in power electronic converters including operation as filters, energy storage and high frequency decoupling. In most cases a desirable low frequency current and an undesirable high frequency ripple current will flow in the main inductor. This current is present due to the switching involved in the operation of power electronic circuits. An inductor may also be connected to a capacitor to create a low-pass filter to allow the flow of low frequency current and to reduce the high frequency ripple.

Transformers are used in power electronic circuits primarily for electrical isolation and/or voltage scaling. Transformers can be sufficiently modeled into a simple lumped component circuit. A power electronic circuit can be used to generate a high frequency pulse width modulation of a low frequency voltage that is fed to a transformer primary winding. The secondary winding of the transformer can then be connected to a filter comprising an inductor and a capacitor.

To simplify the circuit, the leakage inductance of the transformer can be utilized to replace the external inductor of the filter, which reduces the physical number of components in the circuit. The value of the leakage inductor can be dimensioned to that of the required external inductor so that the circuit only requires the external capacitor to complete the filter.

However, such circuitry can result in the external capacitor being large and expensive, as well as the creation of a large, undesirable phase shift between the voltage and current in the output of the circuit. An integrated transformer would have a low frequency current and a high frequency ripple current flowing in the leakage inductor. The current is present due to the high frequency pulse width modulated rectangular-wave voltage applied to the primary winding. The leakage inductor can be operably connected to the external capacitor to create a filter that allows the flow of low frequency current and to reduce AC ripple on the desired output voltage.

A critical problem that arises in such circuitry is that ripple currents in a capacitor induce heating by reason of conductor losses and dielectric losses. The heating of the capacitor in turn reduces its life expectancy. Accordingly, any means that will reduce the ripple current into the capacitor has the potential to increase the life expectancy of a system that uses the capacitor. In addition, the reduction in the ripple current can reduce the required total capacitance, which in turn can lead to a reduction in the size of the capacitor and, hence, of the system. This is conventionally achieved by the mechanism of defining a fixed allowable ripple voltage across the terminals of the main capacitor before and after the ripple current reduction. An alternative can be achieved by reducing the inductance value of the inductor and maintaining the capacitance as per the original design.

There exists techniques that can reduce the ripple voltage on a capacitor and may include an increase in the frequency of the ripple current. Unfortunately, this can also increase the stress on the capacitor more than the benefits provided by a reduction in the ripple current amplitude. This consequence follows because the losses in the capacitor are frequency dependent. In addition, an increase in the frequency applied to the transformer can significantly increase the losses in the transformer, which further results in an increase in temperature. Also, the problem is exacerbated when the power level of the converters is high.

Another method used in an attempt to reduce the ripple voltage across the capacitor terminals is by the addition of more filter components. However, since classic filter design requires that these filters carry the full power of the converter system, the cost of such additional filters outweighs the benefits. There is also difficulty in damping these complex filter arrangements. In addition, the total ripple can only be spread out between all the components. Accordingly, there is a need for a technique, which reduces or eliminates ripple current into a filter capacitor of a transformer, while also reducing or eliminating the above-noted problems.

SUMMARY OF THE INVENTION

The above-noted problems in connection with transformers have been overcome by the present disclosure wherein a ripple current reduction circuit connectable to a transformer is provided. The transformer has primary and secondary windings, a leakage inductance and a first ripple current. The reduction circuit comprises a first capacitor across which an output voltage is provided, and an auxiliary circuit operably connected to the transformer and the first capacitor. The auxiliary circuit has an auxiliary current having a second ripple current that is substantially an opposite or inverse of the first ripple current. The auxiliary circuit combines the auxiliary current with the first ripple current for cancellation or reduction of any ripple current.

In another aspect, a ripple current reduction transformer circuit is provided which comprises a main transformer, a first capacitor and an auxiliary circuit. The main transformer has primary and secondary windings, a leakage inductance and a first ripple current. An output voltage is provided across the first capacitor. The auxiliary circuit is operably connected to the main transformer and the first capacitor. The auxiliary circuit has an auxiliary current having a second ripple current that is substantially an opposite or inverse of the first ripple current. The auxiliary circuit combines the auxiliary current with the first ripple current for cancellation or reduction of any ripple current.

In yet another aspect, a method of reducing a first ripple current of a transformer passing into a filter capacitor is provided. The method comprises providing an auxiliary current having a second ripple current that is substantially an opposite or inverse of the first ripple current. The auxiliary current is combined with the first ripple current for cancellation or reduction of any ripple current.

BRIEF DESCRIPTION OF THE DRAWINGS

The foregoing and still further objects and advantages of the present disclosure will be more apparent from the following detailed explanation of the preferred embodiments of the disclosure in connection with the accompanying drawings.

FIG. 1 depicts a first embodiment of an AC converter ripple reduction circuit;

FIG. 2 depicts typical voltage and current waveforms for the circuit of FIG. 1 with the lower portion showing the "zoomed in" current waveforms;

DETAILED DESCRIPTION OF THE INVENTION

Figure 3:
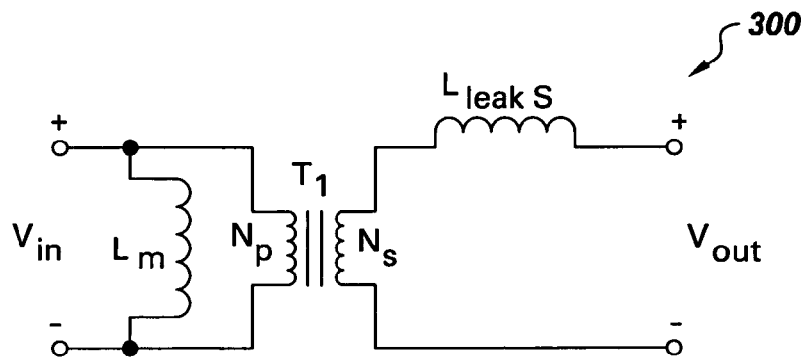
FIG. 3 illustrates a lumped component circuit model for a transformer.

Referring now to FIG. 1 of the drawings, an AC ripple current reduction circuit of one embodiment in accordance with the present disclosure is depicted. The AC ripple reduction circuit of FIG. 1 includes an output capacitor designated $C_{main}$ and an auxiliary circuit capacitor designated $C_1$, which both have a time varying voltage across them with a frequency much less than the ripple frequency of the current in the inductor $L_{main}$ seen in FIG. 1.

It will be noted that in FIG. 1 other elements are provided other than the main capacitor $C_{main}$ and the auxiliary circuit capacitor $C_1$. The circuit also includes a high frequency modulated source of low frequency AC voltage $V_{in}$ across the terminals 10 and 12. Main inductor $L_{main}$ is connected to the upper terminal 10, such that a series circuit is constituted by the connection of $L_{main}$ to the output or main capacitor $C_{main}$ across which an output voltage $V_{Cmain}$ appears. An auxiliary circuit is connected from the output of $L_{main}$ and includes, connected to terminal 12, the auxiliary capacitor $C_1$, which is connected in series with the secondary of transformer $T_1$, and an auxiliary inductor $L_{aux}$ as well as resistor $R_{damp}$, which is connected to the upper output terminal 14. The transformer $T_1$, whose secondary is connected as just noted, has its primary side connected across the main inducter $L_{main}$.

It will thus be understood from the description of FIG. 1 that in the operation of the AC ripple current reduction circuit there is injected an opposing current $I_{aux}$ of the ripple current into one end of the main inductor on the side connected to the main capacitor $C_{main}$. The return path of the injected current is the common of the main ripple voltage source and the main capacitor $C_{main}$. The main current is not present in the inverse ripple current and is derived from the main inductor current. As a result, the ripple current in the AC filter capacitor $C_{main}$ is greatly reduced, thereby relieving the already noted stresses and losses in this capacitor, as well as increasing its filtering effectiveness.

It will now be apparent that there are several advantages provided by the present disclosure. The AC ripple current reduction circuit reduces the ripple current in the attached capacitor. Hence, this circuit can be used to reduce the capacitance of the output and to reduce the stresses on the capacitor $C_{main}$ connected to the inductor and carrying the ripple current. In addition, the auxiliary circuit of the AC ripple current reduction circuit carries only the inverse of the main inductor high frequency ripple current amplitude so there is very little low frequency current component. This can be verified by reference to FIG. 2 in which voltage and current waveforms on the circuit of the present disclosure have been depicted.

FIG. 2 shows some typical voltage and current waveforms for the circuit of FIG. 1. It can clearly be seen that the auxiliary current ($I_{aux}$) ripple is the inverse of the ripple current in the main inductor $L_{main}$. Also clearly shown is the low frequency AC voltages $V_{C_1}$ and $V_{Cmain}$ across capacitors $C_1$ and $C_{main}$. The waveforms depicted in FIG. 2 have been generated by means of a computer simulation.

In order to provide to one skilled in the art information with respect to a source for the ripple circuit of FIG. 1, an example for the source $V_{in}$ is a well-known Pulse Width Modulated (PWM) inverter. The purpose of such an inverter is to convert a DC voltage to an AC voltage. Such an inverter would be made up of a DC-bus capacitor across which two switching devices are connected. The switching devices can be MOSFET (Metal Oxide Silicon Field Effect Transistor), IGBT (Insulated Gate Bi-polar Transistor) or other well known semi-conductor switches. The two switching devices are connected in series. The two switches can never be turned on at the same time as this would constitute a destructive short circuit across the capacitor. The switching devices are turned on and off in sequence such that the on-time of one will be the off time of the other and vice-versa. The switching devices are turned on and off at the rate of the switching frequency (or carrier) and is the high frequency component. The on-time (or off time for the other device) can then be modulated from a minimum to a maximum within the confines of the switching frequency time by a modulating frequency (low frequency). The center connection of the two switching devices form one connection of the source $V_{in}$ and either the center connection of a split DC-Link capacitor or the center connection of a duplicate pair of switching devices form the other connection of the source $V_{in}$. This high frequency modulated with a low frequency voltage is then filtered to extract the low frequency component for the output. A filter is used for this purpose and an example is one made up using $L_{main}$ and $C_{main}$.

The inverter is similar to a DC to DC converter for example. The main difference between the DC ripple circuit and the AC ripple circuit of the present disclosure is the input voltage of the DC version only has one frequency (the carrier) and the AC version has two frequencies (the carrier and the modulator).

Referring to FIG. 3, a lumped component circuit 300 is shown for a model of a main transformer $T_1$. The model transformer circuit 300 excludes loss factors and parasitic capacitive effects. A magnetizing inductance $L_{main}$ is shown on the primary side of the main transformer $T_1$, while a leakage inductance $L_{leakS}$ has been lumped together and referred to the secondary side of the main transformer.

Figure 4:
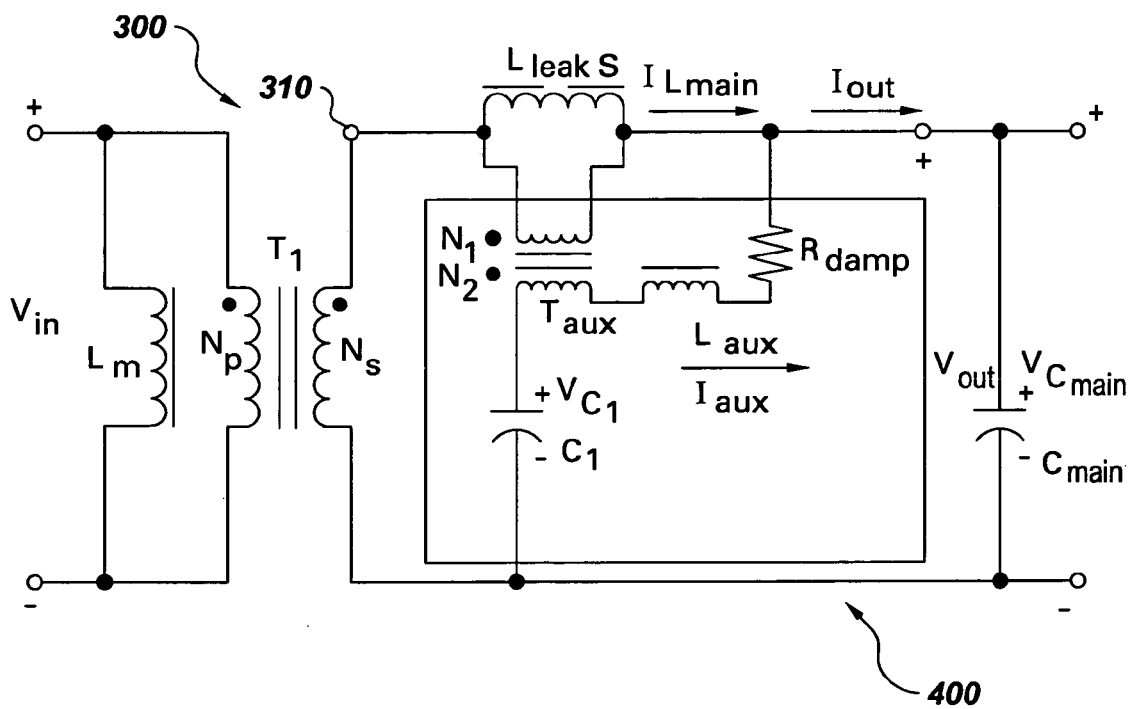
FIG. 4 illustrates the principle connection of the ripple reduction circuit to the transformer model of FIG. 3.

Referring to FIG. 4, a transformer ripple current reduction circuit 400 is shown connected to the lumped component transformer circuit 300. A capacitor $C_{main}$ is connected external to the main transformer $T_1$ and forms part of the output filter, in combination with the leakage inductance $L_{leakS}$. The ripple current reduction circuit 400 is similar to the auxiliary circuit described above with respect to the embodiment of FIG. 1, and has similar components. The transformer ripple current reduction circuit 400 would operate to cancel out the high frequency ripple current of the leakage inductor. However, where the filter inductance $L_{main}$ is embedded in the main transformer $T_1$ as a result of the leakage inductance $L_{leakS}$, then node 310 is not available for direct measurement of the ripple current in the leakage inductor.

Figure 5:
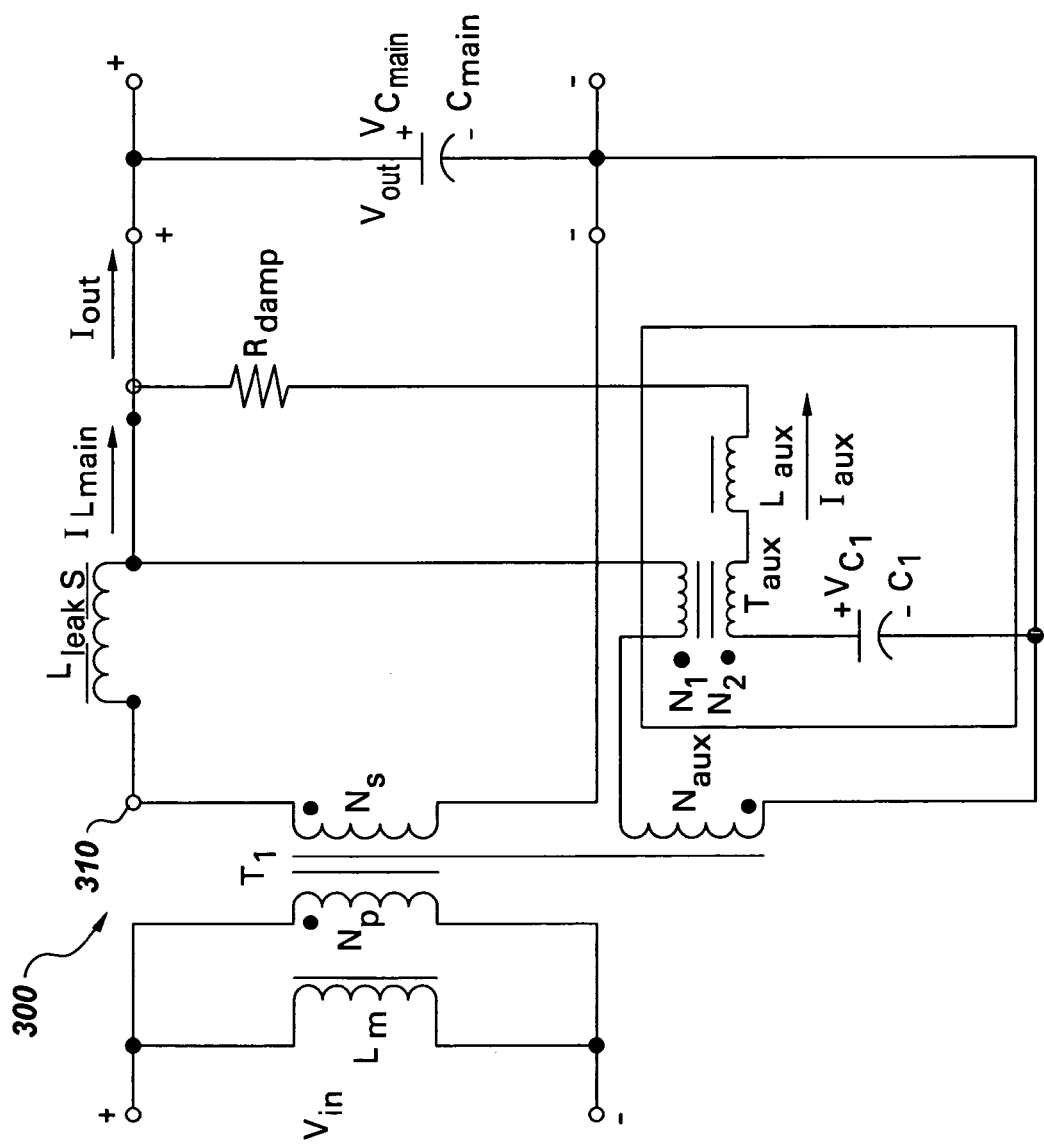
FIG. 5 illustrates an embodiment of a transformer ripple current reduction circuit utilizing an auxiliary winding and being operably coupled to the lumped component circuit model for a transformer.

FIG. 5 shows a preferred embodiment of a transformer ripple current reduction circuit 500, which is operably connected to the lumped component transformer circuit 300, while also allowing for determination of the ripple current reference of the leakage inductance $L_{leakS}$. The transformer ripple current reduction circuit 500 includes an auxiliary winding $N_{aux}$, which allows for determination of a reference voltage equivalent for node 310 shown in FIG. 4. Preferably, the auxiliary winding $N_{aux}$ is wound tightly around the primary winding $N_p$. Through use of the auxiliary winding $N_{aux}$, as well as the auxiliary transformer $T_{aux}$, the auxiliary inductor $L_{aux}$, the auxiliary capacitor $C_1$ and the damping resistor $R_{damp}$, the ripple current reduction circuit 500 can inject an auxiliary current $I_{aux}$, which has a ripple current that is the inverse of the ripple current of the main transformer $T_1$ and leakage inductor.

Figure 6:
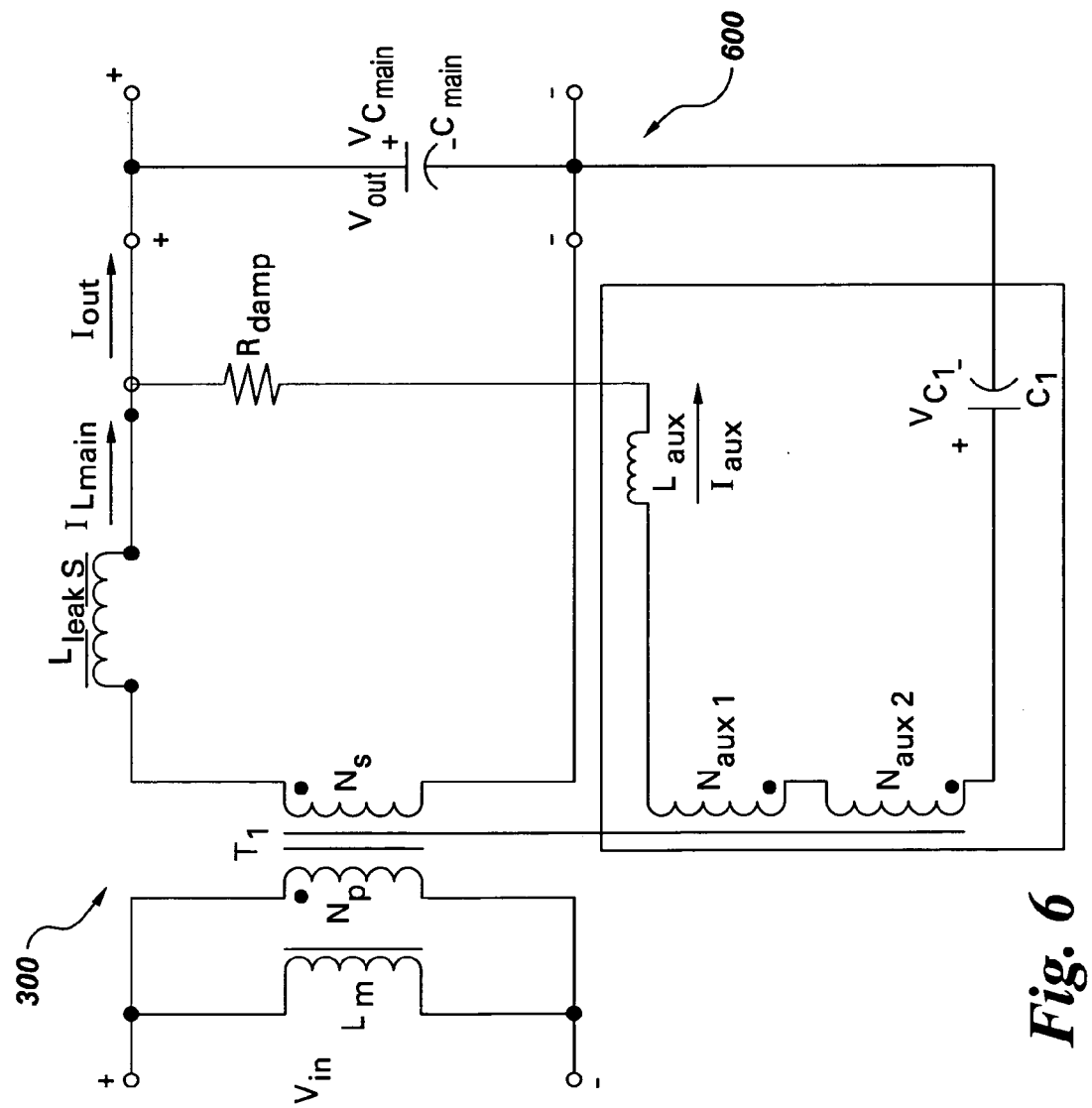
FIG. 6 illustrates a transformer ripple current reduction circuit having an auxiliary transformer integrated into the main transformer of the lumped component circuit model with the auxiliary transformer forming part of the ripple reduction circuit.

FIG. 6 shows an alternative embodiment of a transformer ripple current reduction circuit 600 operably connected to the lumped component transformer circuit 300. Transformer ripple current reduction circuit 600 provides an auxiliary transformer $T_{aux}$ integrated into the main transformer $T_1$. Auxiliary transformer $T_{aux}$ has a first auxiliary winding $N_{aux1}$ that is tightly wound around the secondary winding $N_s$, and also has a second auxiliary winding $N_{aux2}$ that is tightly wound around the primary winding $N_p$. The number of turns of each of the first and second auxiliary windings $N_{aux1}$ and $N_{aux2}$ is equal. The transformer ratio for the main transformer $T_1$ can then be determined by the turns ratio between the secondary winding $N_s$ and the auxiliary windings $N_{aux1}$ and $N_{aux2}$. Through use of the auxiliary transformer $T_{aux}$, as well as the auxiliary inductor $L_{aux}$, the auxiliary capacitor $C_1$, and the damping resistor $R_{damp}$, the ripple current reduction circuit 600 can inject the auxiliary current $I_{aux}$, which has a ripple current that is the inverse of the ripple current of the main transformer $T_1$ and leakage inductor.

The auxiliary inductor $L_{aux}$ is not integrated onto the core of the main transformer $T_1$ because the core flux of the main transformer $T_1$ contains both the ripple current and the main current components, and would interfere with the operation of the ripple current reduction circuit 600. However, the core of the main transformer $T_1$ can be provided with an external extension and the auxiliary inductor $L_{aux}$ can be added thereto. The external extension would be a section of the core of the main transformer $T_1$ that carries little or no magnetic flux from the main transformer.

Figure 7:
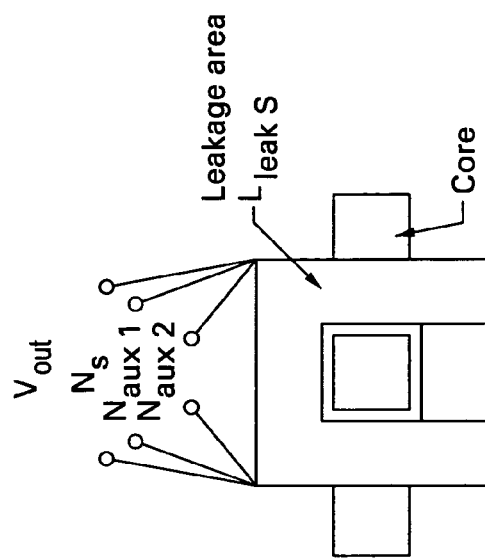
FIG. 7 represents a cross-sectional top view of a symmetrically wound concentric winding transformer with integrated leakage inductance usable with the circuit of FIG. 6.

FIG. 7 shows a cross-sectional view of a symmetrically wound main transformer $T_1$ that can be used, for example, with the circuit of FIG. 6. The auxiliary capacitor $C_1$ can be integrated into the first and second auxiliary windings $N_{aux1}$ and $N_{aux2}$.

Figure 8:
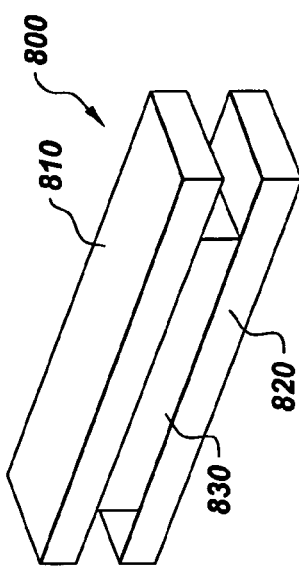
FIG. 8 illustrates a capacitor embedded cable.

An example of, but not limited to, the auxiliary capacitor $C_1$ being integrated into the first and second auxiliary windings $N_{aux1}$ and $N_{aux2}$, is by way of a capacitor embedded cable 800 shown in FIG. 8. Capacitor embedded cable 800 has dielectric substrate 830 with conductors 810 and 820 disposed above the main surfaces of the substrate. The capacitor embedded cable 800 can be wound into the desired shape of the winding. The damping resistor $R_{damp}$ can also be integrated into the structure, such as, for example, by way of a lossy dielectric material used for the capacitor cable.

Figures 9, 10:
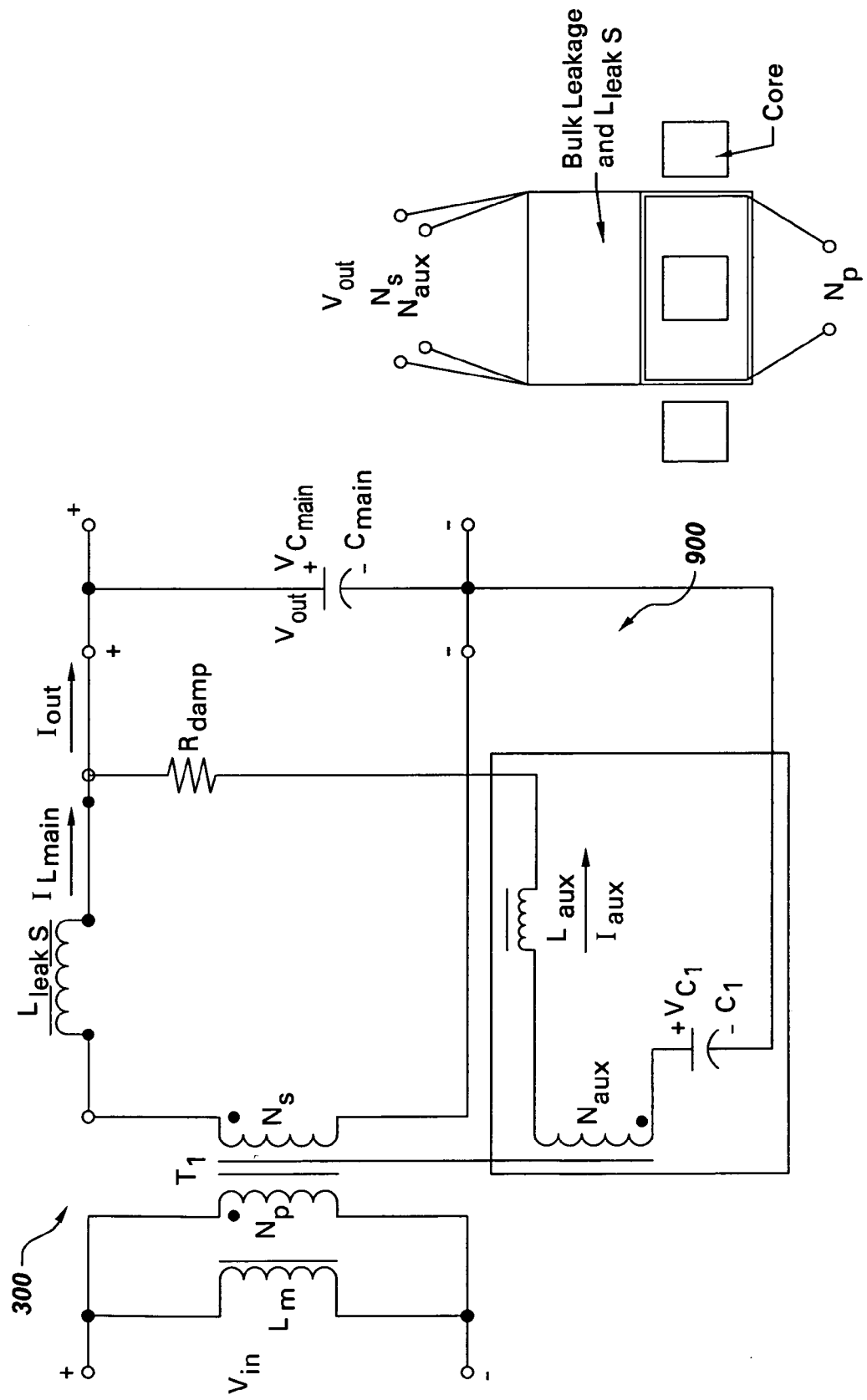
FIG. 9 illustrates another alternative embodiment of a transformer ripple current reduction circuit having an auxiliary winding and being operably coupled to the lumped component circuit model for a transformer.
FIG. 10 represents a cross-sectional top view of an offset-elongated secondary transformer with integrated leakage inductance usable with the circuit of FIG. 9.

FIG. 9 shows another alternative embodiment of a transformer ripple current reduction circuit 900, which is operably connected to the lumped component transformer circuit 300, and also allows for determination of the ripple current reference of the leakage inductance $L_{leakS}$. The transformer ripple current reduction circuit 900 includes an auxiliary winding $N_{aux}$ that is positioned so as to allow for determination of the reference voltage equivalent for node 310 shown in FIG. 4. The positioning of the auxiliary winding $N_{aux}$ encompasses or essentially captures the leakage field area of the main transformer $T_1$ between the primary and secondary windings $N_p$ and $N_s$. As such, the auxiliary winding $N_{aux}$ can be disposed between the primary and secondary windings $N_p$ and $N_s$, to allow for determination of the ripple current reference of the leakage inductance $L_{leakS}$. Through use of the auxiliary winding $N_{aux}$, as well as the auxiliary inductor $L_{aux}$, the auxiliary capacitor $C_1$, and the damping resistor $R_{damp}$, the ripple current reduction circuit 900 can inject the auxiliary current $I_{aux}$, which has a ripple current that is the inverse of the ripple current of the main transformer $T_1$ and leakage inductor.

Although the positioning of the auxiliary winding $N_{aux}$ between the primary and secondary windings $N_p$ and $N_s$ may not be practical with respect to concentrically wound transformers, it can be used with offset-elongated secondary transformers. FIG. 10 shows a cross-sectional view of such a positioning of the auxiliary winding $N_{aux}$ with respect to the primary and secondary windings $N_p$ and $N_s$ that essentially captures or encompasses the leakage field of the main transformer $T_1$, and can be used, for example, with the circuit of FIG. 9. Additionally, the auxiliary capacitor $C_1$ can be integrated into the auxiliary winding $N_{aux}$, such as, for example, by way of capacitor embedded cable. The damping resistor $R_{damp}$ can also be integrated into the structure, such as, for example, by way of a lossy dielectric material used for the capacitor cable.

Auxiliary winding $N_{aux}$ would directly provide the leakage voltage that is required by the ripple current reduction circuit 900. The turns ratio between the secondary winding $N_s$ and the auxiliary winding $N_{aux}$ can be used to determine the transformer ratio. Additionally, as an alternative, the auxiliary inductor $L_{aux}$ may be integrated into the ripple current reduction circuit 900 by distancing the auxiliary winding $N_{aux}$ from either or both of the primary and secondary windings $N_s$ and $N_p$ to create a leakage inductance between the primary and secondary windings.

In the above-described exemplary embodiments, the transformer ripple current reduction circuits 500, 600 and 900 inject a current having a substantially opposing, inverse ripple, as compared to the ripple current of the leakage inductor and main transformer, into one end of the leakage inductor on the side connected to the output main capacitor $C_{main}$. The return path of the injected current is the other terminal of the secondary winding $N_s$, which is also connected to the other terminal of the output main capacitor $C_{main}$. The main current is not present in the inverse ripple current and is derived from the leakage inductor current. As a result, the ripple current in the output main capacitor $C_{main}$, i.e., the output filter capacitor, is greatly reduced which relieves its stresses and losses, as well as increasing the effectiveness of the filter.

The leakage inductor may not be directly accessible to obtain the inductor voltage, but the exemplary embodiments of FIGS. 4 through 9 provide various configurations that allow for determining this voltage. However, the present disclosure contemplates other configurations that allow for the use of a ripple current reduction circuit to be operably connected to a transformer, and to operate to reduce or eliminate the ripple current of the leakage inductor in the secondary side of the transformer.

It will now be apparent that there are several advantages provided by the present disclosure. The transformer ripple current reduction circuits 500, 600 and 900 reduce the ripple current of the leakage inductor into the capacitor attached to the transformer secondary. The transformer ripple current reduction circuits 500, 600 and 900 can be used to reduce the capacitance connected to the transformer secondary and/or can also reduce the stresses on the capacitor $C_{main}$. The transformer ripple current reduction circuits 500, 600 and 900 carry only the main ripple current amplitude so there is very little low frequency current component. The transformer ripple current reduction circuits 500, 600 and 900 do not carry the low frequency main inductor current. The transformer ripple current reduction circuits 500, 600 and 900 can be partially or completely integrated into the main transformer $T_1$ so that the number of components in the circuit does not increase.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated for carrying out this disclosure, but that the disclosure will include all embodiments falling within the scope of the appended claims.

What is claimed is:

1. A ripple current reduction circuit connectable to a transformer having primary and secondary windings, a leakage inductance and a first ripple current, the reduction circuit comprising:
    a first capacitor across which an output voltage is provided; and
    an auxiliary circuit operably connected to the transformer and said first capacitor, wherein said auxiliary circuit has an auxiliary current having a second ripple current, wherein said second ripple current is substantially an inverse of the first ripple current, and wherein said auxiliary circuit combines said auxiliary current with the first ripple current to create a substantially high frequency ripple free alternating current.

2. The reduction circuit of claim 1, wherein said auxiliary circuit comprises:
    an auxiliary transformer having an auxiliary primary winding and an auxiliary secondary winding, said auxiliary transformer being operably coupled to the leakage inductance of the transformer; and
    a second capacitor in series with said auxiliary secondary winding.

3. The reduction circuit of claim 2, wherein said auxiliary circuit further comprises an auxiliary inductor and a damping resistor in series with said second capacitor and said auxiliary secondary winding.

4. The reduction circuit of claim 1, wherein said auxiliary circuit comprises:
    a first auxiliary winding connected to the primary winding of the transformer;
    an auxiliary transformer having an auxiliary primary winding and an auxiliary secondary winding, said auxiliary transformer being operably coupled to the leakage inductance of the transformer; and
    a second capacitor in series with said auxiliary secondary winding.

5. The reduction circuit of claim 4, wherein said auxiliary circuit further comprises an auxiliary inductor and a damping resistor in series with said second capacitor and said auxiliary secondary winding.

6. The reduction circuit of claim 1, wherein said auxiliary circuit comprises:
    a first auxiliary winding connected to the secondary winding of the transformer; and
    a second auxiliary winding connected to the primary winding of the transformer.

7. The reduction circuit of claim 6, wherein said auxiliary circuit further comprises:
    a second capacitor in series with said first and second auxiliary windings;
    an auxiliary inductor in series with said second capacitor and said first and second auxiliary windings; and
    a damping resistor in series with said second capacitor and said first and second auxiliary windings.

8. The reduction circuit of claim 6, wherein said auxiliary circuit further comprises an auxiliary inductor connected to a portion of a core of the transformer that has minimal flux.

9. The reduction circuit of claim 6, wherein said auxiliary circuit further comprises a second capacitor that is integrally formed with said first and second auxiliary windings.

10. The circuit of claim 9, wherein said auxiliary circuit further comprises a damping resistor that is integrally formed with said second capacitor and said first and second auxiliary windings.

11. The circuit of claim 10, wherein said damping resistor is integrally formed with said second capacitor and said first and second auxiliary windings through use of a lossy dielectric material.

12. The circuit of claim 1, wherein said auxiliary circuit comprises a first auxiliary winding wound between the primary and secondary windings of the transformer.

13. The reduction circuit of claim 12, wherein said first auxiliary winding is separated from either or both of the primary and secondary windings of the transformer.

14. The reduction circuit of claim 12, wherein said auxiliary circuit further comprises:
    a second capacitor in series with said first auxiliary winding;
    an auxiliary inductor in series with said second capacitor and said first auxiliary winding; and a damping resistor in series with said second capacitor and said first auxiliary winding.

15. The reduction circuit of claim 12, wherein said auxiliary circuit further comprises a second capacitor that is integrally formed with said first auxiliary winding.

16. The reduction circuit of claim 15, wherein said auxiliary circuit further comprises a damping resistor that is integrally formed with said second capacitor and said first auxiliary winding.

17. The reduction circuit of claim 16, wherein said damping resistor is integrally formed with said second capacitor and said first auxiliary winding through use of a lossy dielectric material.

18. A ripple current reduction transformer circuit comprising:
   a main transformer having primary and secondary windings, a leakage inductance and a first ripple current;
   a first capacitor across which an AC output voltage is provided; and
   an auxiliary circuit operably connected to said main transformer and said first capacitor, wherein said auxiliary circuit has an auxiliary current having a second ripple current, wherein said second ripple current is substantially an inverse of said first ripple current, and wherein said auxiliary circuit combines said auxiliary current with said first ripple current.

19. The reduction transformer circuit of claim 18, wherein said auxiliary circuit comprises:
   an auxiliary transformer having an auxiliary primary winding and an auxiliary secondary winding, said auxiliary transformer being operably coupled to said leakage inductance of said main transformer; and
   a second capacitor in series with said auxiliary secondary winding.

20. The reduction transformer circuit of claim 19, wherein said auxiliary circuit further comprises an auxiliary inductor and a damping resistor in series with said second capacitor and said auxiliary secondary winding.

21. The reduction transformer circuit of claim 18, wherein said auxiliary circuit comprises:
   a first auxiliary winding connected to said primary winding of said main transformer;
   an auxiliary transformer having an auxiliary primary winding and an auxiliary secondary winding, said auxiliary transformer being operably coupled to said leakage inductance of said main transformer; and
   a second capacitor in series with said auxiliary secondary winding.

22. The reduction transformer circuit of claim 21, wherein said auxiliary circuit further comprises an auxiliary inductor and a damping resistor in series with said second capacitor and said auxiliary secondary winding.

23. The reduction transformer circuit of claim 18, wherein said auxiliary circuit comprises:
   a first auxiliary winding connected to said secondary winding of said main transformer; and
   a second auxiliary winding connected to said primary winding of said main transformer.

24. The reduction transformer circuit of claim 23, wherein said auxiliary circuit further comprises:
   a second capacitor in series with said first and second auxiliary windings;
   an auxiliary inductor in series with said second capacitor and said first and second auxiliary windings; and
   a damping resistor in series with said second capacitor and said first and second auxiliary windings.

25. The reduction transformer circuit of claim 23, wherein said auxiliary circuit further comprises an auxiliary inductor connected to a portion of a core of said main transformer that has minimal flux.

26. The reduction transformer circuit of claim 23, wherein said auxiliary circuit further comprises a second capacitor that is integrally formed with said first and second auxiliary windings.

27. The reduction transformer circuit of claim 26, wherein said auxiliary circuit further comprises a damping resistor that is integrally formed with said second capacitor and said first and second auxiliary windings.

28. The reduction transformer circuit of claim 27, wherein said damping resistor is integrally formed with said second capacitor and said first and second auxiliary windings through use of a lossy dielectric material.

29. The reduction transformer circuit of claim 18, wherein said auxiliary circuit comprises a first auxiliary winding wound between said primary and secondary windings of said main transformer.

30. The reduction transformer circuit of claim 29, wherein said first auxiliary winding is separated from either or both of said primary and secondary windings of said main transformer.

31. The reduction transformer circuit of claim 29, wherein said auxiliary circuit further comprises:
   a second capacitor in series with said first auxiliary winding;
   an auxiliary inductor in series with said second capacitor and said first auxiliary winding; and
   a damping resistor in series with said second capacitor and said first auxiliary winding.

32. The reduction transformer circuit of claim 29, wherein said auxiliary circuit further comprises a second capacitor that is integrally formed with said first auxiliary winding.

33. The reduction transformer circuit of claim 32, wherein said auxiliary circuit further comprises a damping resistor that is integrally formed with said second capacitor and said first auxiliary winding.

34. The reduction transformer circuit of claim 33, wherein said damping resistor is integrally formed with said second capacitor and said first auxiliary winding through use of a lossy dielectric material.

35. A method of reducing a first ripple current of a transformer passing into a filter capacitor comprising:
   providing an auxiliary current having a second ripple current that is substantially an inverse of the first ripple current; and
   combining said auxiliary current with the first ripple current to create a substantially high frequency ripple free alternating current.

36. The method of claim 35, wherein said auxiliary current is provided by an auxiliary circuit operably connected to the transformer and comprising an auxiliary transformer, a second capacitor, an auxiliary inductor and a damping resistor, wherein said auxiliary transformer is operably coupled to a leakage inductance of the transformer.

37. The method of claim 35, wherein said auxiliary current is provided by an auxiliary circuit operably connected to the transformer and comprising a first auxiliary winding, an auxiliary transformer, a second capacitor, an auxiliary inductor and a damping resistor, wherein said first auxiliary winding is tightly coupled magnetically to a primary winding of the transformer, and wherein said auxiliary transformer is operably coupled to a leakage inductance of the transformer.

38. The method of claim 35, wherein said auxiliary current is provided by an auxiliary circuit operably connected to the transformer and comprising a first auxiliary winding, a second auxiliary winding, a second capacitor, an auxiliary inductor, and a damping resistor, wherein said first auxiliary winding is tightly coupled magnetically to a secondary winding of the transformer, and wherein said second auxiliary winding is tightly coupled magnetically to a primary winding of the transformer.

39. The method of claim 35, wherein said auxiliary current is provided by an auxiliary circuit operably connected to the transformer and comprising a first auxiliary winding, a second capacitor, an auxiliary inductor, and a damping resistor, wherein said first auxiliary winding is wound between primary and secondary windings of the transformer.

* * * * *